United States Patent [19]
Vargo

[11] 3,912,074
[45] Oct. 14, 1975

[54] CARTON FOR AUTOMOBILE AIR FILTER

[75] Inventor: John W. Vargo, Cleveland, Ohio

[73] Assignee: Filter Dynamics International, Inc., Cleveland, Ohio

[22] Filed: July 18, 1973

[21] Appl. No.: 369,091

Related U.S. Application Data

[63] Continuation-in-part of Ser. No. 339,121, March 8, 1973, abandoned.

[52] U.S. Cl. ............ 206/45.14; 206/303; 206/395; 206/408; 206/491; 229/22; 229/31 FS
[51] Int. Cl.².. B65D 5/24; B65D 5/50; B65D 85/02
[58] Field of Search ........... 206/303, 491, 389, 395, 206/408, 45.14; 229/40, 32, 22, 31 FS

[56] References Cited
UNITED STATES PATENTS

| | | |
|---|---|---|
| 2,036,542 | 4/1936 | Rosenthal..................... 229/31 FS |
| 2,301,927 | 11/1942 | Brogden............................... 229/22 |
| 2,414,763 | 1/1947 | Palmer ........................... 229/31 FS |
| 2,953,245 | 9/1960 | Fastron.............................. 242/55.3 |
| 3,208,583 | 9/1965 | Kamps............................. 206/45.14 |
| 3,226,008 | 12/1965 | Chiorri................................ 229/32 |
| 3,315,868 | 4/1967 | Hempfling........................... 229/40 |
| 3,638,851 | 2/1972 | Offer et al. .......................... 229/40 |

*Primary Examiner*—William I. Price
*Assistant Examiner*—Allan N. Shoap
*Attorney, Agent, or Firm*—Alter and Weiss

[57] ABSTRACT

The invention provides a low cost package and display system for a point of sales and especially - although not exclusively - to a carton for an automobile air filter which is well suited for self-service sales of automobile parts in discount houses, department stores, or the like. A particular feature of the invention is that quick lock tabs snap a tubular frame around a circular housing to both display and protect the air filter.

2 Claims, 7 Drawing Figures

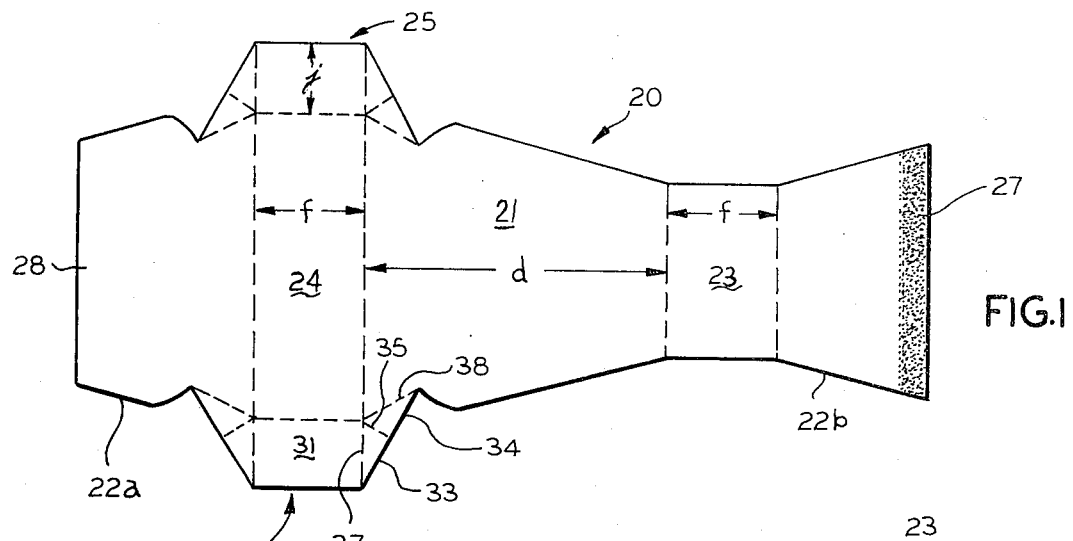
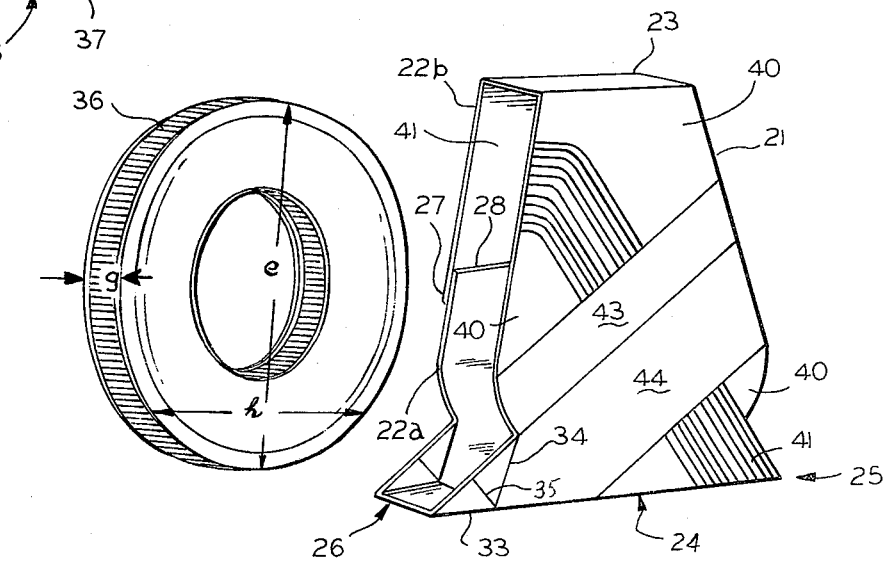
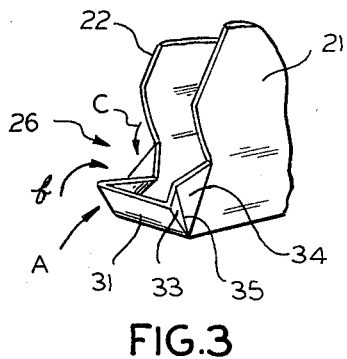
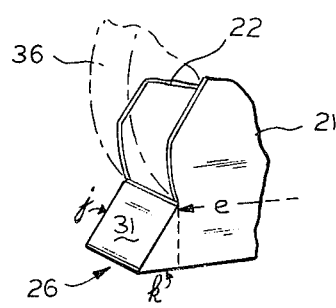

CARTON FOR AUTOMOBILE AIR FILTER

This is a continuation-in-part of my earlier copending application Ser. No. 339,121, filed Mar. 8, 1973, now abandoned.

This invention relates to point of sale packaging and, more particularly, to custom cartons designed for self service display and selection of automotive air filter.

Corresponding automobile parts are almost identical for most makes and models of automobiles. Yet, almost always, they are also different in some minor detail for each make of automobile. For example, the air filters for two different makes of automobiles may appear to be identical to the eye. However, the air filter for one automobile may have, say, a quarter inch smaller radius and be a half inch thicker than the filter for another automobile. As a result, the buyer has to choose between a bewildering variety of air filters. As a generality, the same situation prevails for almost all other auto parts as well.

Another problem is that all of these and similar parts come in small boxes with specialized names. Very often, the casual do-it-yourself buyer either does not know or does not care about the differences between the many parts of an automobile. Hence, if he wants to perform even the simplest form of maintenance, he does not even know what name to use when he buys or which box to open when he inspects. Thus, he has his choice of blindly opening many boxes in search of the wanted part, or of giving up. If he opens boxes at random, soon they are so torn and worn that the merchandise in them cannot be sold.

The entire business of normal auto maintenance parts sales is well adapted to the mass marketing of a discount house, for example, if buyer confusion is eliminated. When one reflects on the relatively low skill level required to select an air filter, for example, it becomes immediately apparent that any specialized knowledge required to select a proper box is merely a matter of familiarity and not skill. As a result of these and similar problems, discount and other mass marketing stores do almost no substantial amount of business in the sale of auto maintenance parts.

Accordingly, an object of the invention is to provide new and improved point of sales packaging and display means. Here an object is to provide packaging which protects the goods while displaying them to the general view of the customer. Another object is to so display the goods to the customer while effectively helping him to make a selection. In this connection, an object is to accomplish the foregoing objects at a minimum cost.

Still other objects of the invention will readily occur to those who are skilled in the art.

In keeping with an aspect of the invention, a simple, tubular form of box receives a product responsive to a simple slip-in insertion thereof, with no lids to close. This way the customer may see the product that he is buying. Tabs on the box fold into a locked position by means of an interference fit where a serrated edge of the tab locks against the contours of the product itself. Hence, the box is locked onto the product itself to both protect and display it.

The nature of a preferred embodiment of the invention will become more apparent from a study of the attached drawing wherein:

FIG. 1 is a plan view showing a carton blank used to enclose an air filter;

FIG. 2 is a perspective view of a carton made from the blank of FIG. 1 with an air filter about to be placed therein;

FIG. 3 is a perspective view of a fragment of the carton of FIG. 2 showing a locking tab as it is being folded into a locking position;

FIG. 4 is a perspective view of the carton fragment of FIG. 3 after the tab is locked into position.

Figure 5:
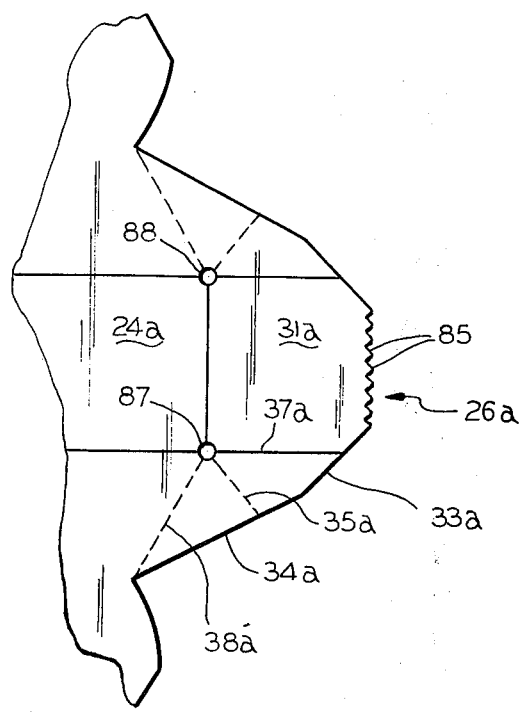
FIG. 5 is a plan view showing a tab or locking member portion of a blank used to lock the carton in place.

The principles of the invention may be incorporated into packages for many different types of products. Here it is shown, by way of examlpe, as a preferred carton for enclosing an automobile air filter. However, the invention should be construed broadly enough to cover all equivalent structures.

The carton blank 20 includes front and back panels 21, 22, top and bottom panels 23, 24, and locking tabs 25, 26. Any one of the panels (here, back panel 22) may be formed in two parts which are glued or otherwise fastened together. For example, the upper half 22b of the back panel has a glue flap 27 which fits against the end 28 of the lower half 22a of the back panel. Hence, the fully assembled carton is generally a tubular member having a rectangular cross section.

The dimensions of the air filter and carton are such that the filter fits snuggly into the carton. Then, the filter may be locked into position by the tabs 25, 26. In greater detail, the carton has front and back panels 21, 22, each having somewhat truncated triangular shape. The bases of the truncated triangles are integrally joined together by the rectangular bottom panel 24. The tops of the truncated triangles are joined together by the rectangular top panel 23. The altitude $d$ of each of the truncated triangles is substantially equal to the diameter $e$ of the air filter cylinder 36. The width $f$ of the top and bottom 23, 24 are substantially equal to the thickness $g$ of the air filter cylinder 36. The length of the bottom panel 24 is greater than a chord of an arc $h$ of the air filter by an extended amount on each end approximately equal to one side $k$ (FIG. 4) and the hypotenuse $j$ of a right angle triangle formed between the bottom panel and the cylinder. The hypotenuse forms a tab which extends from the end of the side $k$ and engages the circumference of the air filter at the intercept of the chord $h$ when the filter is in position in the carton.

Each such tab includes the locking member 31 and a hinged pair of integral folding guide panels 33, 34. The guide panel 33 is integral with locking member 31, which in turn is an extension of the bottom panel. The guide panel 34 is integral with the side panel 21. Panel 33 folds with respect to locking member 31 along line 37, and panel 34 folds with respect to side panel 21 along line 38. When locking member 31 is lifted in direction A (FIG. 3), the two guide panels fold inwardly toward the interior of the box in directions b and c.

As the tab 31 is lifted, the panels 33, 34 fold along the hinge line 35. The locking member 31 may then be pushed under the air filter 36 where it is locked in place by interference friction under the receding peripheral contours formed by the circumference of the filter.

Figure 6:
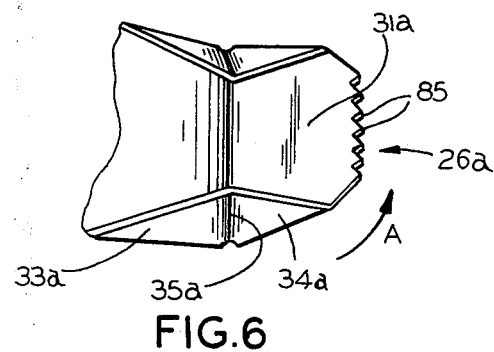
FIG. 6 is a perspective view of the tab or locking member portion of FIG. 5 as it is being folded into place.
Figure 7:
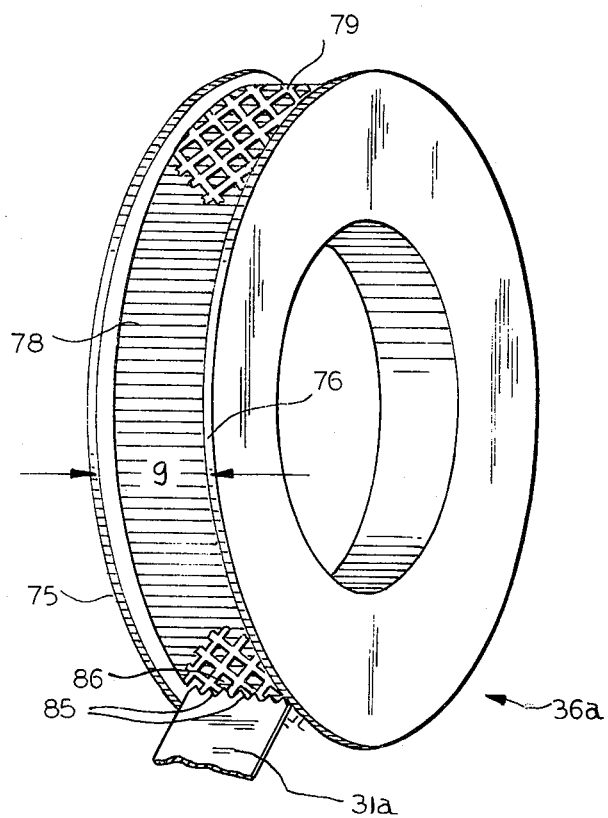
FIG. 7 is a perspective view of an automobile air filter showing how the tab portion folds up toward the circumferential periphery of the air filter to lock therein.

According to a further refinement of the invention, the ends of the locking tabs are serrated or otherwise shaped and formed to provide a more positive locking. This refinement is shown and explained in FIGS. 5–7 where parts similar to those explained above have the same reference numeral, with the suffix letter $a$ added thereto. These parts will not be here described again since that information is available by a rereading of the foregoing.

In greater detail, an automobile air filter is usually a circular or annular object which has a housing comprised of upper and lower ring-shaped plates 75, 76 (FIG. 7) separated by a distance $g$. A circular pleated filter paper member 78 is positioned between and coaxially with the ring-shaped housing members 75, 76. Outside the circular periphery of the pleated paper is a protective metallic ring 79 which extends across the full width $g$, spanning the plates 75, 76. this metallic ring must have sufficient open space or areas therein to enable a passage of air therethrough. Hence, it almost invariably is a wire screen, a thin perforated sheet of metal, or the like.

The metallic ring 79 guards the pleated filter paper and also prevents the insertion of the tab or locking member 31$a$ into the pleats. Accordingly, the end 26$a$ of the tab or locking member 31$a$ is serrated to provide a number of teeth for entering into the perforations of the metallic ring. Thus, as the tab or locking member 31$a$ is pressed into the final position against the circumference of the filter, the teeth 85 are pressured into the perforations 86 where they frictionally lock themselves into position.

To facilitate the folding of the tab or locking member and the associated panels 33$a$, 34$a$, a hole 87, 88 is punched at the intersections of the fold lines 35$a$, 37$a$, and 38$a$. Thus, there is no large amount of bulk at this point.

Thus, to package the air filter, the cardboard form of FIG. 1 is glued together at 27, 28. Then, the tube is opened to have its rectangular cross-section, as shown in FIG. 2. Next, the air filter 36 is slipped into the box, and the locking tabs 25, 26 are pushed into position under the periphery of the filter. By simply looking, the customer may quickly identify the product which he needs and inspect it without damage to the box. The side panels may carry any advertising message, color coding, or other information which further aids product selection, as shown symbolically at 40–44.

Still other advantages and modifications will readily occur to those skilled in the art. Therefore, the appended claims are to be construed to cover all equivalents falling within the scope and spirit of the invention.

I claim:

1. A carton for packaging a cylindrical product having a predetermined circular contour and thickness, said carton comprising a tube having generally rectangular cross section, said carton having a front panel, a back panel, a top panel and a bottom panel all integrally hinged together, said bottom panel being wider than said top panel, said front and back panels each having a somewhat truncated triangular shape having wider portions at the bottom thereof and narrow portions at the top thereof, the narrow portions of said front and back panels being equal in width to the top panel, the distance from the top panel to the bottom panel being substantially equal to the diameter of the cylindrical product, two locking tab means integrally formed on opposite ends of only the bottom panel, said tab means comprising a locking member and integrally there with a pair of folding guide members, said locking member comprising a generally rectangular panel which is serrated at the point of said friction lock, aperture means in said carton at the intersections of the bottom panel, the locking member, the pair of folding guide panels and the front and back panels, said locking member being an extension of said bottom panel and separated therefrom by a fold line, said folding guide panels comprising a triangular section joining each of said front and back panels with said bottom panel extension, and said pair of folding guide panels having a hinge line dividing said guide panels into a pair of right angle triangles, so that when said locking member is folded toward said product said guide panels fold upon each other and upon said locking panel to guide and hold it in an interference friction lock against the contours of the products contained in said carton.

2. The carton of claim 1, wherein said peripheral cylindrical shape includes a protective ring having perforations therein, the serrations of said locking tab members engaging said perforations.

\* \* \* \* \*